United States Patent [19]

Ueda

[11] Patent Number: 4,838,667
[45] Date of Patent: Jun. 13, 1989

[54] ZOOM LENS SYSTEM FOR USE IN MICROFILM PROJECTION APPARATUS

[75] Inventor: Toshihiko Ueda, Toyokawa, Japan

[73] Assignee: Minolta Camera Kabushiki Kaisha, Osaka, Japan

[21] Appl. No.: 130,006

[22] Filed: Dec. 8, 1987

[30] Foreign Application Priority Data

Dec. 8, 1986 [JP] Japan .................. 61-291797

[51] Int. Cl.$^4$ .................................... G02B 15/14
[52] U.S. Cl. ........................... 350/427; 350/449
[58] Field of Search .................. 350/423, 427, 449

[56] References Cited

U.S. PATENT DOCUMENTS 3,141,921 7/1964 Linke .................. 350/423
3,360,325 12/1967 Gustafson .................. 350/427
4,733,951 3/1988 Pareigat .................. 350/423

FOREIGN PATENT DOCUMENTS 47-35028 9/1972 Japan .
57-4016 1/1982 Japan .
57-73715 5/1982 Japan .

Primary Examiner—Bruce Y. Arnold
Assistant Examiner—Scott J. Sugarman
Attorney, Agent, or Firm—Price, Gess & Ubell

[57] ABSTRACT

A zoom lens system for use in microfilm projection apparatus in which the image projection is conducted in a condition of a definite object-image distance, the system comprising from the enlargement side to the reduction side, a first lens group of a positive refractive power disposed at the screen side and including an aperture stop disposed at the enlargement side of the first lens group and a second lens group of a negative refractive power disposed at the film side, wherein the first and second lens groups are moved along the optical axis while increasing a distance therebetween in an operation of zooming from the longest focal length side to the shortest focal length side.

5 Claims, 4 Drawing Sheets

FIG.4a
effective F$_{NO.}$=4.0
$\beta$=-0.036
$f$=46.0
— d
—·— F
—··— C
----- SC
spherical aberration

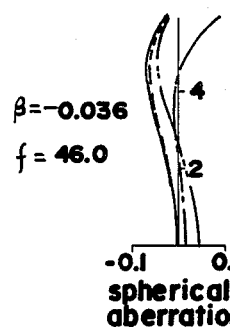

FIG.4b
$\omega$=11.5°
—— DS — d
---- DT --- d
astigmatism

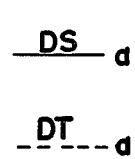
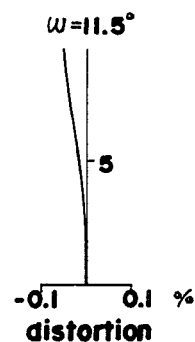

FIG.4c
$\omega$=11.5°
distortion %

FIG.5a
effective F$_{NO.}$=3.4
$\beta$=-0.030
$f$=39.3
— d
—·— F
—··— C
----- SC
spherical aberration

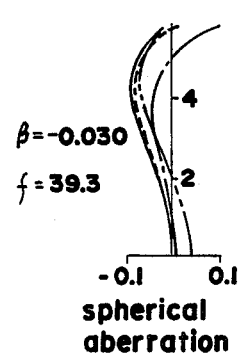

FIG.5b
$\omega$=11.5°
—— DS — d
---- DT --- d
astigmatism

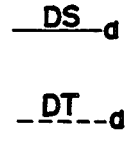
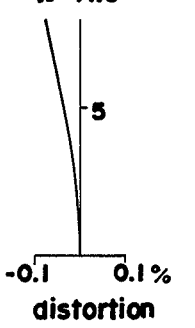

FIG.5c
$\omega$=11.5°
distortion %

FIG.6a
effective F$_{NO.}$=3.0
$\beta$=-0.026
$f$=34.3
— d
—·— F
—··— C
----- SC
spherical aberration

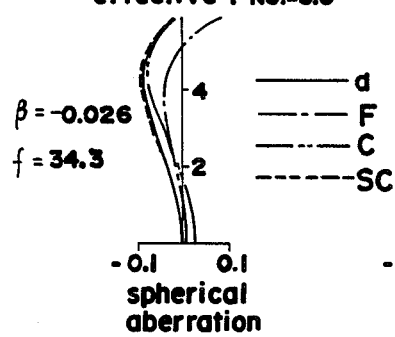

FIG.6b
$\omega$=11.5°
—— DS — d
---- DT --- d
astigmatism

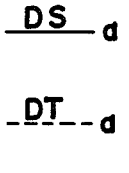
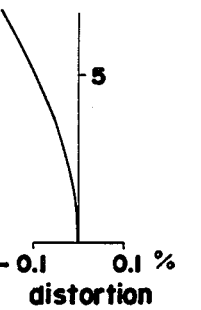

FIG.6c
$\omega$=11.5°
distortion %

ZOOM LENS SYSTEM FOR USE IN MICROFILM PROJECTION APPARATUS

FIELD OF THE INVENTION

The present invention relates to a zoom lens system for use in a microfilm projection apparatus such as microfilm readers, microfilm reader/printers and the like, and more particularly to a zoom lens system for projecting images of microfilms in a range of 20x to 28x at a definite object-image distance.

One example of a microfilm reader is shown in FIG. 1. The image on the microfilm M, sandwiched between flat glass plates 1, projected onto a screen 7 via a lens system 2, an image rotation prism 3 and mirrors 4, 5, 6. The rotation of the prism 3 rotates the image on the screen 7 without moving the film M.

In the conventional microfilm projection apparatus as shown in FIG. 1, there is used lens systems having constant magnification. If an user wishes to project the images at another magnification, it is necessary for the user to change the presently used lens system to another lens system having another magnification. Change of the lens are troublesome work for the user. Therefore, a zoom lens system is proposed for use in a microfilm projection apparatus.

One proposal is shown in Japanese Laid-Open Patent Application No. 57-73715 which discloses a zoom lens system having first, second and third lens groups and an aperture stop disposed between the second and third lens groups. This lens system has a drawback in that the light amount varies on a projection surface, that is, a screen surface is altered largely according to the zooming operation, so that the user has disagreeable feeling. The above mentioned drawback will be explained in more detail referring to FIG. 2 which shows a model of a lens system having a first lens group I and a second lens group II movable along an optical axis in the zooming operation, respectively, and an aperture stop disposed between the first and second lens groups. An effective F number of the enlargement side is determined by a size of an entrance pupil viewed from the enlargement side, namely, a size of a virtual image V of a stop S viewed through the first lens group I from the enlargement side. The effective F number is proportionally represented in a following algebraic expression:

$$\frac{1}{2 \sin U}$$

where U is a half angle of spread of spread of light flux of on-axis. Zooming movement of the first lens group I causes alteration of the effective F number since the half angle U and also the radius and position of the virtual image of the stop S are altered.

U.S. Pat. No. 3,360,325 discloses a zoom lens system having an image rotation prism therein. The image rotation prism, which is a Dove prism in this patent, causes aberrations to the whole lens system, so that it is necessary for the correction of the aberrations to increase the number of lenses. Furthermore, the zoom lens system of this U.S. Patent has the same drawback as Japanese Laid-Open Patent Application No. 57-73715 since an aperture stop is disposed between movable lens groups.

SUMMARY OF THE INVENTION

Accordingly, an object of the present invention is to provide an improved zoom lens system for projecting images of microfilms at a definite object-image distance.

Another object of the present invention is to provide a zoom lens system capable of keeping an effective F number in agreeable range irrespective of zooming movement.

Still another object of the present invention is to provide a zoom lens system being compact and adapted with an image rotation prism.

These and other objects of the present invention can be fulfilled by a zoom lens system for use in a microfilm projection apparatus, the system comprising from the enlargement side to the reduction side a first movable lens group of positive refractive power, a second movable lens group of negative refractive power and an aperture stop disposed at the enlargement side in the first movable lens group, wherein the first and second lens groups are moved along an optical axis while increasing a distance between the first and second lens groups in the operation of zooming from the longest focal length side to the shortest focal length side.

More specifically, the first lens group includes, from the enlargement side, a positive lens element, a biconcave lens element, a positive lens element and a positive lens unit composed of a positive lens element and a negative lens element cemented together. The second lens group includes a positive meniscus lens element with a concave surface faced to the enlargement side and a negative lens unit composed of a negative lens element and a positive lens element cemented together.

The features of the present invention which are believed to be novel are set forth with particularity in the appended claims. The present invention, both as to its organization and advantages thereof, may best be understood by reference to the following description.

BRIEF DESCRIPTION OF THE DRAWINGS

FIGS. 4a to 4c are diagrams showing aberration curves of the first embodiment at −0.036x;

FIGS. 5a to 5c are diagrams showing aberration curves of the first embodiment at 0.30x;

FIGS. 6a to 6c are diagrams showing aberration curves of the first embodiment at −0.026x;

DESCRIPTION OF THE PREFERRED EMBODIMENTS

The following description is provided to enable any person skilled in the optical art to make and use the invention and sets forth the best modes contemplated by the inventor of carrying out his invention. Various modification, however, will remain readily apparent to those skilled in the art, since the generic principles of the present invention have been defined herein specifically to provide a zoom lens system.

In the accompanying drawings which supplement the following tables, the lenses in accordance with the present invention are illustrated diagrammatically. The individual lenses are designated by the letter L with a subscript number (typed as an adscript number) corresponding to the consecutive numbers of the lenses from the enlargement side to the reduction side. The radii of curvature of the lenses are indicated by r, with a subscript (abscript number) corresponding to consecutive numbers of the lenses. The axial distances, d, along the optical axis are set forth in the tables and include both the axial spacings between the lenses and the thickness of the lenses. Finally, the refractive index, N, and Abbe number, $\nu$, are provided in each of the tables.

Figure 1:
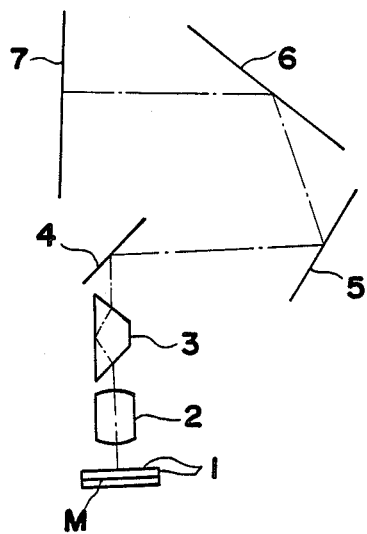
FIG. 1 is a diagram showing a microfilm reader having an image rotation prism.
Figure 2:
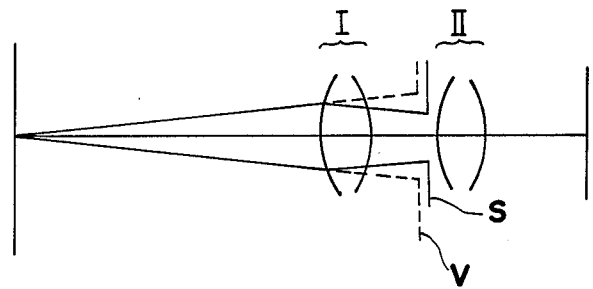
FIG. 2 is a schematic view for showing the model system used in the conventional apparatus.
Figure 3A:
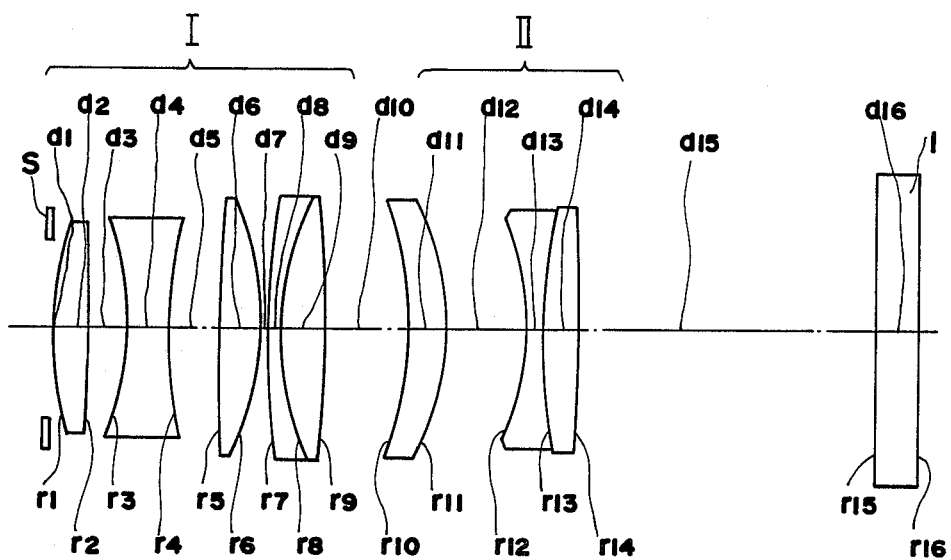
FIG. 3a is a diagram in section showing the zoom lens system of first and second embodiments in the longest focal length side.

Referring to FIG. 3a, the zoom lens system of the present invention comprises first and second lens groups I and II aligned in order from the enlargement side (screen side) and an aperture stop S disposed at the enlargement side in the first lens group I.

The first and second lens groups I and II are moved along the optical axis independently so as to vary magnifications while keeping the object-image distance constant. More specifically, the first and second lens groups I and II are moved while increasing a distance d10 during zooming from the longest focal length side to the shortest focal length side.

The first lens group I is of a positive refractive power and comprises from the enlargement side a positive lens L1, a biconcave lens L2, a positive len L3 and a positive lens unit composed of a positive lens L4 and a negative lens L5 cemented together. That is to say, the first lens group is the Tessar type of posi-nega-posi or a modification thereof which is suitable for the correction of spherical aberration and coma if coordinated with a front or enlargement side stop.

The second lens group II is of a negative refractive power and comprises, from the enlargement side, a positive meniscus lens L6 with a concave surface faced to the enlargement side and a negative lens unit composed of a negative lens L7 and positive lens L8 cemented together. The second lens group contributes to the correction of any aberrations, especially astigmatism and coma of offaxis at zooming.

The aperture stop S is disposed at the enlargement side in the first lens group I. The term "enlargement side" means inclusively a position of the lens end (enlargement side) of the first lens group I and any position between the lens end and the lens center so that the variation of the effective F number of enlargement side is kept in agreeable range. Further the aperture stop S may be moved integrally with the first lens group I or independently thereof.

Figure 3B:
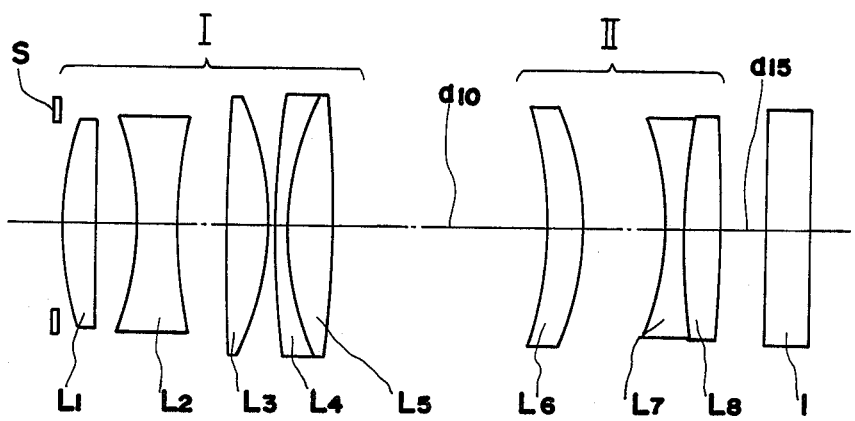
FIG. 3b is a diagram in section showing the zoom lens system of the first and second embodiments in the shortest focal length side.
Figure 7A:
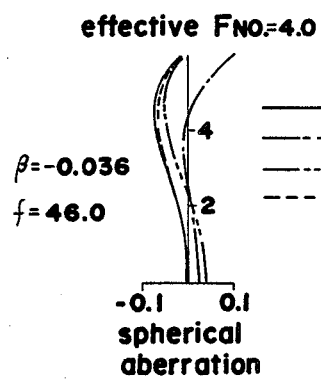
FIGS. 7a to 7c are diagrams showing aberration curves of the second embodiment at −0.036x.
Figure 7B:
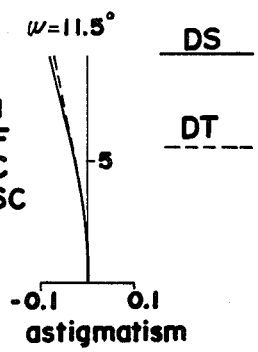
Figure 7C:
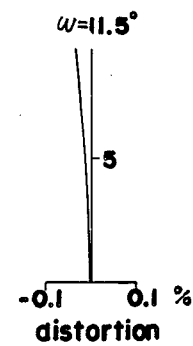
Figure 8A:
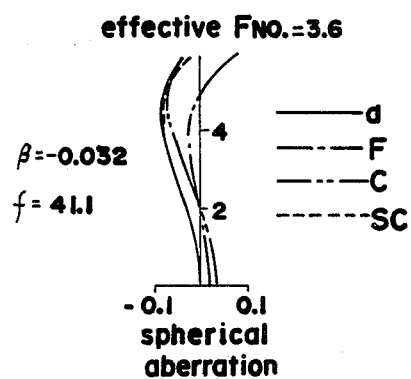
FIGS. 8a to 8c are diagrams showing aberration curves of the second embodiment at −0.032x.
Figure 8B:
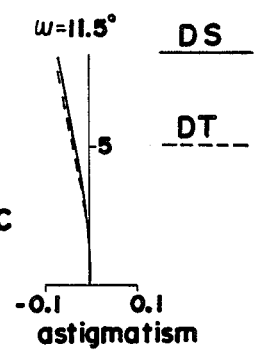
Figure 8C:
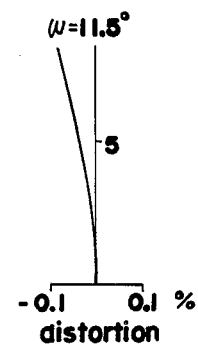
Figure 9A:
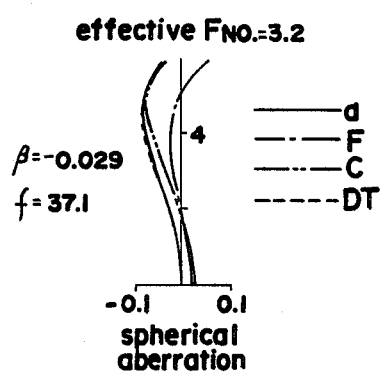
FIGS. 9a to 9c are diagrams showing aberration curves of the second embodiment at −0.029x.
Figure 9B:
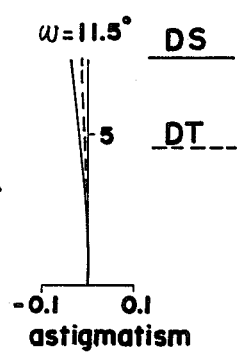
Figure 9C:
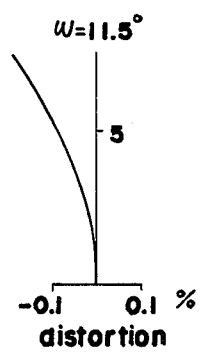

The following tables 1 and 2 disclose, respectively, the first and second embodiments of the present invention which have the same configuration as shown in FIG. 3 but different numerical values. In the tables, r is the radius of curvature, d is the axial distance, N is the refractive index and $\nu$ is the Abbe number.

TABLE 1

| radius of curvature | axial distance | refractive index Nd | Abbe number $\nu d$ |
|---|---|---|---|
| $\beta = -0.036 \sim -0.030 \sim -0.026$ | | | |

TABLE 1-continued

| | radius of curvature | axial distance | | refractive index Nd | | Abbe number $\nu d$ |
|---|---|---|---|---|---|---|
| S | aperture stop | $d_1$ | 0.000 | | | |
| $r_1$ | 26.269 | | | | | |
| | | $d_2$ | 2.300 | $N_1$ 1.75450 | $\nu_1$ | 32.8 |
| $r_2$ | −311.893 | | | | | |
| | | $d_3$ | 2.600 | | | |
| $r_3$ | −19.551 | | | | | |
| | | $d_4$ | 2.700 | $N_2$ 1.68300 | $\nu_2$ | 31.5 |
| $r_4$ | 33.256 | | | | | |
| | | $d_5$ | 3.400 | | | |
| $r_5$ | 272.150 | | | | | |
| | | $d_6$ | 2.800 | $N_3$ 1.69680 | $\nu_3$ | 56.5 |
| $r_6$ | −19.267 | | | | | |
| | | $d_7$ | 0.400 | | | |
| $r_7$ | 62.642 | | | | | |
| | | $d_8$ | 0.900 | $N_4$ 1.67339 | $\nu_4$ | 29.3 |
| $r_8$ | 20.159 | | | | | |
| | | $d_9$ | 3.000 | $N_5$ 1.60311 | $\nu_5$ | 60.7 |
| $r_9$ | −74.207 | | | | | |
| | | $d_{10}$ | 5.600 ~ 10.053 ~ 14.537 | | | |
| $r_{10}$ | −22.632 | | | | | |
| | | $d_{11}$ | 2.400 | $N_6$ 1.80518 | $\nu_6$ | 25.4 |
| $r_{11}$ | −18.547 | | | | | |
| | | $d_{12}$ | 5.400 | | | |
| $r_{12}$ | −18.028 | | | | | |
| | | $d_{13}$ | 1.200 | $N_7$ 1.72000 | $\nu_7$ | 52.1 |
| $r_{13}$ | 45.156 | | | | | |
| | | $d_{14}$ | 2.500 | $N_8$ 1.66608 | $\nu_8$ | 48.0 |
| $r_{14}$ | −107.560 | | | | | |
| | | $d_{15}$ | 19.900 ~ 10.222 ~ 3.000 | | | |
| $r_{15}$ | 0.000 | | | | | |
| | | $d_{16}$ | 3.000 | | | |
| $r_{16}$ | 0.000 | | | | | |

$\Sigma d = 58.100 \sim 52.875 \sim 50.138$
$f = 46.0 \sim 39.3 \sim 34.3$
effective $F_{No.} = 4.0 \sim 3.4 \sim 3.0$

TABLE 2

| | radius of curvature | axial distance | | refractive index Nd | | Abbe number $\nu d$ |
|---|---|---|---|---|---|---|
| | $\beta =$ | −0.036 | −0.032 | −0.029 | | |
| S | aperture stop | $d_1$ | 0.000 | | | |
| $r_1$ | 28.414 | | | | | |
| | | $d_2$ | 2.500 | $N_1$ 1.75450 | $\nu_1$ | 32.8 |
| $r_2$ | −329.436 | | | | | |
| | | $d_3$ | 2.800 | | | |
| $r_3$ | −20.906 | | | | | |
| | | $d_4$ | 2.950 | $N_2$ 1.68300 | $\nu_2$ | 31.5 |
| $r_4$ | 35.600 | | | | | |
| | | $d_5$ | 3.700 | | | |
| $r_5$ | 292.812 | | | | | |
| | | $d_6$ | 3.000 | $N_3$ 1.69680 | $\nu_3$ | 56.5 |
| $r_6$ | −20.642 | | | | | |
| | | $d_7$ | 0.400 | | | |
| $r_7$ | 69.948 | | | | | |
| | | $d_8$ | 1.000 | $N_4$ 1.67339 | $\nu_4$ | 29.3 |
| $r_8$ | 21.906 | | | | | |
| | | $d_9$ | 3.200 | $N_5$ 1.60311 | $\nu_5$ | 60.7 |
| $r_9$ | −77.765 | | | | | |
| | | $d_{10}$ | 8.500 ~ 12.227 ~ 15.975 | | | |
| $r_{10}$ | −24.486 | | | | | |
| | | $d_{11}$ | 2.600 | $N_6$ 1.80518 | $\nu_6$ | 25.4 |
| $r_{11}$ | −20.163 | | | | | |
| | | $d_{12}$ | 5.800 | | | |
| $r_{12}$ | −19.926 | | | | | |
| | | $d_{13}$ | 1.250 | $N_7$ 1.72000 | $\nu_7$ | 52.1 |
| $r_{13}$ | 32.432 | | | | | |
| | | $d_{14}$ | 2.700 | $N_8$ 1.66608 | $\nu_8$ | 48.0 |
| $r_{14}$ | −108.543 | | | | | |
| | | $d_{15}$ | 16.500 ~ 9.280 ~ 3.447 | | | |
| $r_{15}$ | 0.000 | | | | | |
| | | $d_{16}$ | 3.000 | | | |
| $r_{16}$ | 0.000 | | | | | |

$\Sigma d = 59.900 \sim 56.407 \sim 54.322$
$f = 46.0 \sim 41.1 \sim 37.1$
effective $F_{No.} = 4.0 \sim 3.6 \sim 3.2$ The zoom lens system of the present invention has the aperture stop movable with the zooming operation. The aperture stop may be fixed on a predetermined position. However, movable type of the aperture stop produces an advantage on the correction of various aberrations. If the zooming range is low (for example 20x to 28x), the displacement of the aperture stop may cause the deficit of the projected image in combination with a small-sized image rotation prism. In the zoom lens system with middle or high zooming range (for example 28x to 38x), the displacement of the aperture stop, which is disposed at the enlargement side in the first lens group and is moved together with the first lens group, does not affect the image formation because the middle or high range zoom lens system has a small diameter of incident pupil.

Accordingly, the zoom lens system of the present invention can conduct the zooming operation while keeping in-focus condition and can combine with a small-sized image rotation prism.

What is claimed is:

1. A zoom lens system for use in a microfilm projection apparatus in which the image projection is conducted at a condition of a definite object-image distance, the system consisting of, from the enlargement side to the reduction side:
   a first movable lens group of a positive refractive power disposed at the screen side, the first lens group including an aperture stop disposed at the enlargement side of the first lens group, a positive lens element, a biconcave lens element and a positive lens unit composed of a positive lens element and a negative lens element cemented together; and
   a second movable lens group of a negative refractive power disposed at the film side, the second lens group including a positive meniscus lens element with a concave surface faced to the enlargement side and a negative lens unit composed of a negative lens element and a positive lens element cemented together,
   wherein the first and second lens groups are moved independently along the optical axis while increasing a distance therebetween in an operation of zooming from the longest focal length side to the shortest focal length side.

2. A zoom lens system for use in a microfilm projection apparatus in which the image projection is conducted at a condition of a definite object-image distance, the system consisting of from the enlargement side to the reduction side:
   a first movable lens group of positive refractive power disposed at the screen side, the first lens group including an aperture stop disposed at the enlargement side of the first lens group, a positive lens element, a biconcave lens element, a positive lens element and a positive lens unit composed of a positive lens element and a negative lens element cemented together, and
   a second movable lens group of a negative refractive power disposed at the film side, wherein the first and second lens groups are moved independently along the optical axis while increasing a distance therebetween in an operation of zooming from the longest focal length side to the shortest focal length side.

3. A zoom lens system as claimed in claim 2, wherein the aperture stop is so constituted as to move integrally with the first lens group.

4. A zoom lens system for use in a microfilm projection apparatus in which the image projection is conducted at a condition of a definite object-image-distance, the system consisting of from the enlargement side to the reduction side:
   a first movable lens group of positive refractive power disposed at the screen side, the first lens group including an aperture stop disposed at the enlargement side of the first lens group, and a second movable lens group of a negative refractive power disposed at the film side, the second lens group including a positive meniscus lens element with a concave surface faced to the enlargement side and negative lens unit composed of a negative lens element and a positive lens element cemented together, wherein the first and second lens groups are moved independently along the optical axis while increasing a distance therebetween in an operation of zooming from the longest focal length side to the shortest focal length side.

5. A zoom lens system as claimed in claim 4, wherein the aperture stop is so constituted as to move integrally with the first lens group.

* * * * *